United States Patent

Barcel

[11] Patent Number: 5,993,030
[45] Date of Patent: Nov. 30, 1999

[54] TRAVELLING LIGHTING SYSTEM

[76] Inventor: Barton J. Barcel, R.R. 1, Box 152B, Bellwood, Nebr. 68624

[21] Appl. No.: 09/018,174

[22] Filed: Feb. 3, 1998

[51] Int. Cl.$^6$ .................................................. F21V 21/00
[52] U.S. Cl. .......................... 362/408; 362/404; 362/238; 362/145; 362/1
[58] Field of Search ........................... 362/122, 230–231, 362/233, 238, 404, 408, 1, 2, 263, 145, 147

[56] References Cited

U.S. PATENT DOCUMENTS

| D. 245,044 | 7/1977  | Pollack .................................. D96/12 H |
| D. 304,173 | 10/1989 | Frassati et al. ........................... D13/13 |
| D. 317,513 | 6/1991  | Miller et al. ............................. D26/140 |
| 1,631,488  | 6/1927  | Jones ................................... 362/147 X |
| 3,818,217  | 6/1974  | Hetz .................................... 362/233 X |
| 3,885,865  | 5/1975  | Stern et al. .................................. 353/2 |
| 4,146,993  | 4/1979  | Freeman, Sr. ................................ 47/17 |
| 4,163,342  | 8/1979  | Fogg et al. ................................... 47/58 |
| 4,196,544  | 4/1980  | Davis et al. ................................. 47/17 |
| 4,214,296  | 7/1980  | Magett ....................................... 362/35 |
| 4,430,694  | 2/1984  | Kiovumäki et al. ................. 362/404 X |
| 4,441,145  | 4/1984  | Antkowiak ............................... 362/384 |
| 4,734,830  | 3/1988  | Cristian et al. ............................ 362/35 |
| 4,747,025  | 5/1988  | Barton ...................................... 362/147 |
| 4,837,665  | 6/1989  | Hoyer et al. ......................... 362/233 X |
| 4,875,648  | 10/1989 | Guarnori .................................. 248/125 |
| 5,065,294  | 11/1991 | Poot, Jr. .................................. 362/346 |
| 5,095,414  | 3/1992  | Tinus ....................................... 362/284 |
| 5,347,431  | 9/1994  | Blackwell et al. .................. 362/231 X |
| 5,355,804  | 10/1994 | Garcia et al. .............................. 104/93 |
| 5,419,260  | 5/1995  | Hamilton ................................... 104/89 |
| 5,679,023  | 10/1997 | Anderson, Jr. et al. ............ 362/147 X |

Primary Examiner—Laura K. Tso
Attorney, Agent, or Firm—Zarley, McKee, Thomte Voorhees & Sease; Dennis L. Thomte

[57] ABSTRACT

A travelling lighting system for a greenhouse includes a plurality of lamps supported on an elongated truss which is slowly advanced back and forth across a greenhouse bay to provide lighting for the plants therein. The truss may be supported by trolleys carried in a pair of parallel spaced apart tracks extending the length of the greenhouse bay. A power drive system advances the truss along the tracks. A power cord support rail may be provided above the truss to collect and support the electrical power cord to the truss at spaced apart locations along the cord to prevent sagging as the truss is advanced toward the electrical power source.

18 Claims, 6 Drawing Sheets

& # x 2 0 ;

TRAVELLING LIGHTING SYSTEM

BACKGROUND OF THE INVENTION

1. Technical Field

This invention is directed generally to lighting systems and more particularly to a travelling lighting system for use in greenhouses to provide more effective lighting at lower cost.

2. Description of the Prior Art

Large commercial greenhouses include artificial light systems to reduce or eliminate their dependency on natural sunlight. Such systems generally include a plurality of stationary lamps situated throughout the greenhouse for lighting all of those areas where plants are to be grown. The stationary lamps tend to create hot spots that can result in temperatures as high as 250° at the plant tissue surfaces directly below the lamps. Plants grown in a greenhouse with a conventional stationary lighting system tend to experience disease due to extensive periods with wet leaves because of poor radiant heat distribution.

Finally, electricity necessary to light the greenhouse is generally the greatest expense of a greenhouse operation. Therefore, any reduction in the required number of lights would result in significant cost savings for the operation of the greenhouse.

Accordingly, a primary object of the present invention is to provide a travelling lighting system.

Another object is to provide a travelling lighting system within a greenhouse.

Another object is to substantially reduce the electrical lighting expense of a greenhouse by providing a travelling lighting system which affords effective light with a substantially reduced number of lamps compared to a conventional stationary lighting system.

Another object is to provide a travelling lighting system for a greenhouse which is effective to direct more light to the leaf surface of plants in the greenhouse.

Another object is to provide a travelling lighting system within a greenhouse which eliminates radiant heat damage to plants created by the lights.

Another object is to provide a travelling lighting system for greenhouses which simulates natural light from the sun due to the movement of the lights with respect to the plants.

Another object is to provide a travelling lighting system for greenhouses which reduces plant diseases by providing better radiant heat distribution through the movement of the lights.

Another object is to provide a travelling lighting system for greenhouses which promotes superior plant performance.

Finally, an object is to provide a travelling lighting system which is simple and rugged in construction, economical to manufacture and operate and efficient in operation.

SUMMARY OF THE INVENTION

The travelling lighting system of the present invention includes an elongated lamp support beam or truss having a plurality of lamps supported thereon at spaced apart locations along the truss. A pair of elongated tracks are supported above the greenhouse floor in parallel spaced apart relation for movably supporting the truss. At least one trolley is movable along each track and is connected to the truss whereby the truss substantially spans the distance between the tracks and is movable along the length of the tracks. A power drive system is operably connected to the truss and is actuatable to reciprocally move the truss back and forth along the length of the tracks to light the plants below the truss.

The lamps are preferably geothermal lamps operative to produce both the red and blue light that are beneficial for plants. The truss itself may be formed as a plurality of truss sections interconnected in end-to-end relation so that trusses of different lengths can be assembled for different installations, depending on the size of the greenhouse. The tracks are preferably inverted generally U-shaped channels having spaced apart bottom flanges for supporting the wheels of the truss support trolleys. At least one trolley is connected to each end of the truss and the tracks are spaced apart by a distance to accommodate rolling support of the trolleys at the opposite ends of the truss.

The power drive system is adjustable to vary the speed of movement of the truss. It additionally includes limit switches positioned in the path of the truss for engagement by the truss to reverse the direction of movement of the truss. One embodiment of the power drive system includes a drive wheel and a driven wheel supported within the greenhouse at spaced apart positions, an elongated tension member such as a chain or cable extending around the drive and driven wheels and connected to the truss, and a reversible motor operatively connected to the drive wheels whereby the truss is moved in forward and reverse directions in response to rotation of the drive wheel in opposite directions.

The power cord, which extends from a source of electric power to the truss for powering the lamps thereon, is prevented from sagging as the truss moves toward the source of electric power by providing a power cord support rail adjacent the truss and longitudinally extended in the direction of movement of the truss. A plurality of power cord trolleys are connected to the power cord at spaced apart locations and are movably supported on the rail to limit sagging of the power cord throughout the reciprocal movement of the truss.

The travelling lighting system of the present invention has substantial benefits over current conventional stationary greenhouse lighting systems. Because of the unique way the travelling lighting system travels back and forth, the greenhouse gets better light distribution with one-third the lights of a conventional system. This allows for a savings of two-thirds of the electrical energy that would normally be used. This is consistent with energy and cost savings programs.

From the plants' perspective, the plants receive a higher quality of light to the leaf surface thereof. The travelling lighting system is an imitation of what happens in nature with a stationary light source and a rotating earth.

A particular advantage is that the travelling lighting system of this invention substantially reduces hot spots. Stationary greenhouse lighting systems tend to create hot spots that can result in temperatures as high as 250° at the plant tissue surface. Because the lighting is not stationary in the travelling lighting system, plants grown under the lamps of the system do not experience hot spots.

Furthermore, plants grown under the travelling lighting system experience fewer diseases because of better radiant heat distribution from the lighting. Plants that experience less time with wet leaves have fewer disease problems.

DESCRIPTION OF THE PREFERRED EMBODIMENT

Figure 1:
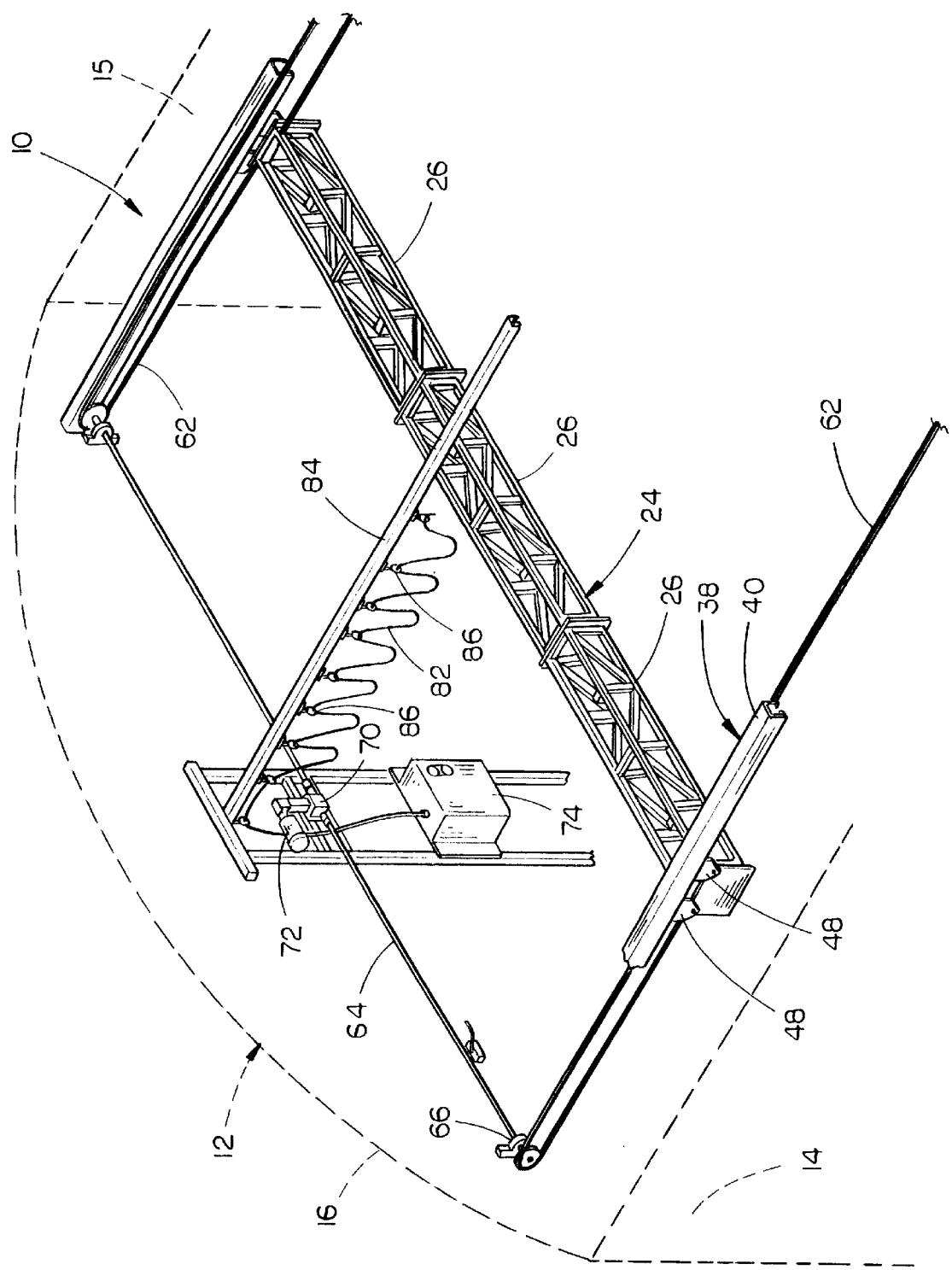
FIG. 1 is a perspective view of the travelling lighting system within a greenhouse indicated in dotted lines.
Figure 2:
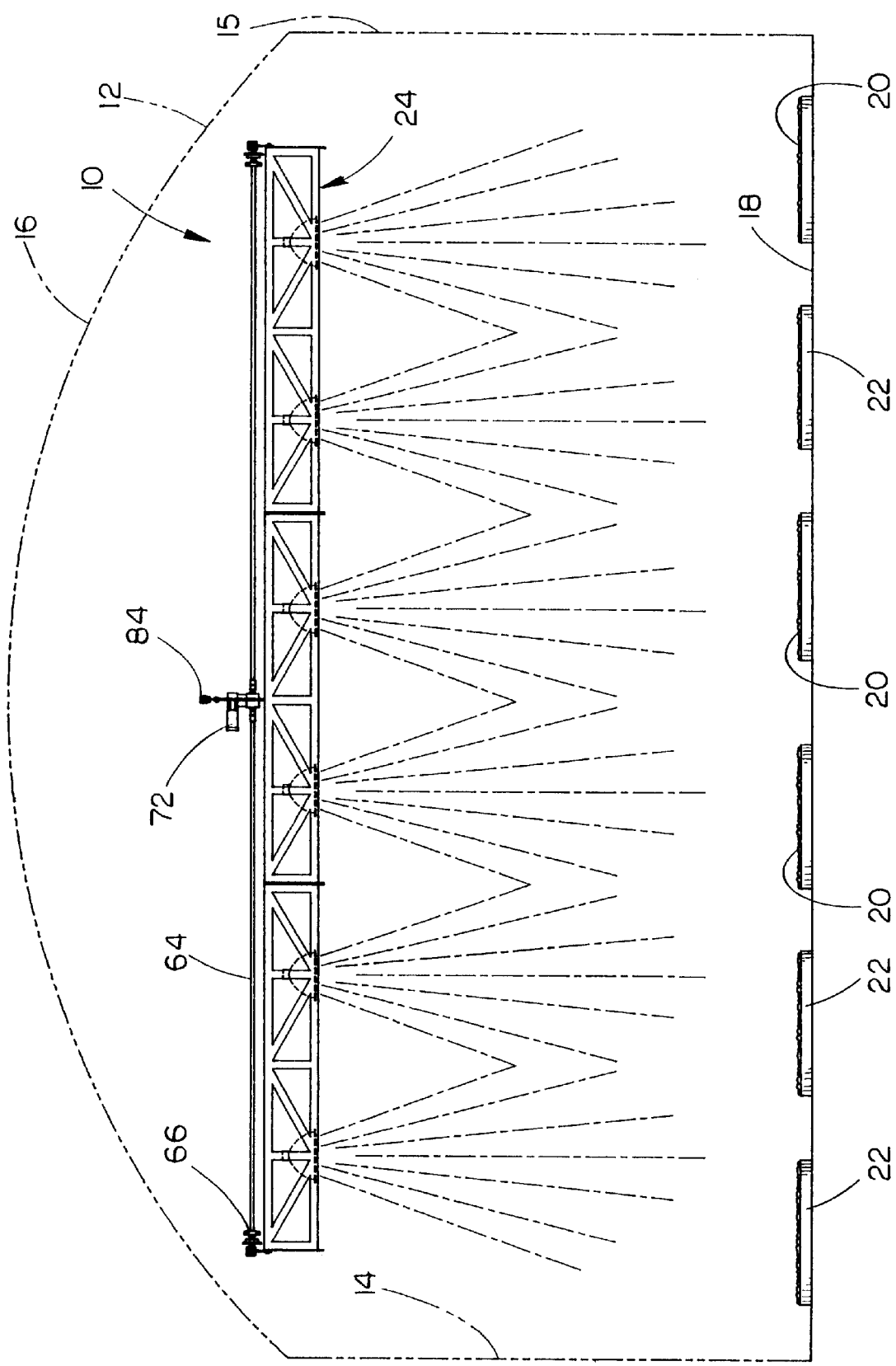
FIG. 2 is an end elevational view illustrating the travelling lighting system installed within a greenhouse indicated in dotted lines.

The travelling lighting system 10 is illustrated in FIGS. 1 and 2 installed within a greenhouse, indicated in dotted lines at 12. The travelling lighting system 10 may span the entire greenhouse, as illustrated, or a single bay of a multi-bay large commercial greenhouse. The greenhouse is diagrammatically illustrated as having walls 14 and 15, roof 16 and a roof support structure of any known form. The floor 18 of the greenhouse affords expansive floor space for growing plants 20 in beds 22 situated throughout the floor space.

The system 10 includes an elongated lamp support beam 24 which is preferably in the form of a truss. The illustrated embodiment of truss 24 includes three eight-foot truss sections 26. Each section includes four subbeams 28 running the length of the section, and end framework 30 at each end and a plurality of links 32, 33 and 34 interconnecting the subbeams 28 to form the illustrated truss 24. Whereas the illustrated truss 24 is rectangular in cross-section, alternate trusses could be triangular or of any other cross-sectional shape which affords sufficient rigidity to span the width of a greenhouse bay which is to be lighted.

A plurality of lamps 36 are supported on the truss 24, preferably in uniformly spaced relation, for shining light onto the plants below them, as illustrated in FIG. 2. In the illustrated embodiment, two lamps are supported on each truss section 26 for a total of six lamps on the truss 24. Each lamp is supported, oriented and protected within the truss for shining light downwardly onto the plants.

Whereas no particular type of lamp or number of lamps is critical to the present invention, it is suggested that the latest technology be utilized. High pressure sodium and metal halide lamps produce both the red and blue light that are desirable for plant growth.

The truss 24 is preferably supported for movement along a pair of tracks supported on structural members within the greenhouse in parallel spaced apart relation above the floor. In the illustrated embodiment, each track 38 comprises an inverted generally U-shaped channel 40 having a top web 42, sidewalls 44 and 45 and in-turned bottom flanges 46 and 47.

Figure 3:
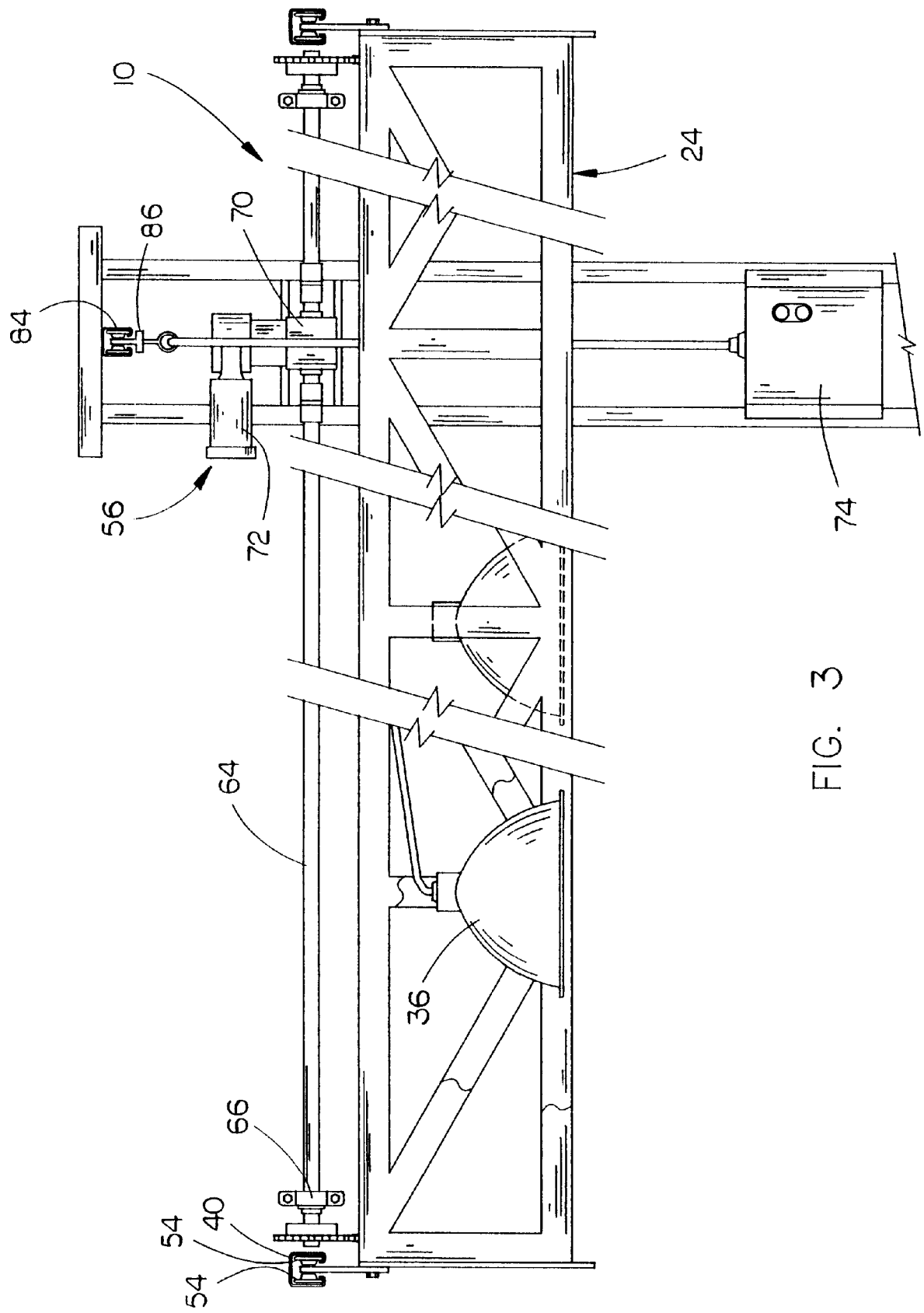
FIG. 3 is a foreshortened end view illustrating the power drive system for the travelling lighting system.
Figure 4:
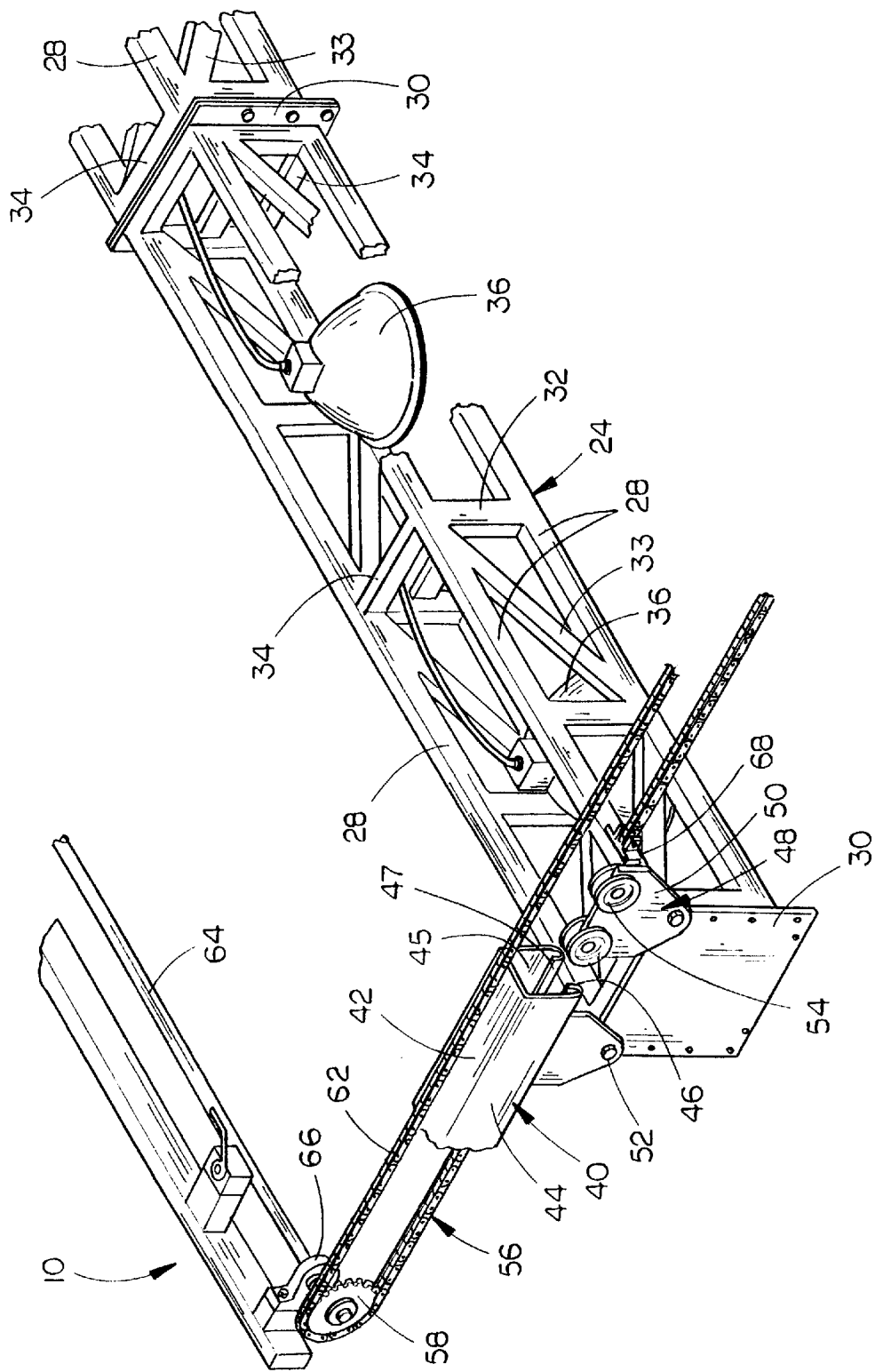
FIG. 4 is a partial perspective view, with portions broken away for clarity, to show the track support system for the lamp-carrying truss.

A pair of trolleys 48 support each end of truss 24 on a respective channel 40. The trolleys 48 are best illustrated in FIGS. 3 and 4. Each trolley 48 includes an upstanding frame or panel 50 having a lower portion connected to the truss 24 by bolt 52 or any other suitable connection. The top of the frame 50 supports two pairs of wheels 54, each pair having a wheel 54 rotatably supported on opposite sides of frame 50 and spaced relative to one another for rolling support on the bottom flanges 46 and 47 of a respective channel 40. The pair of trolleys 48 on each end of the truss afford stable, safe support.

Figure 5:
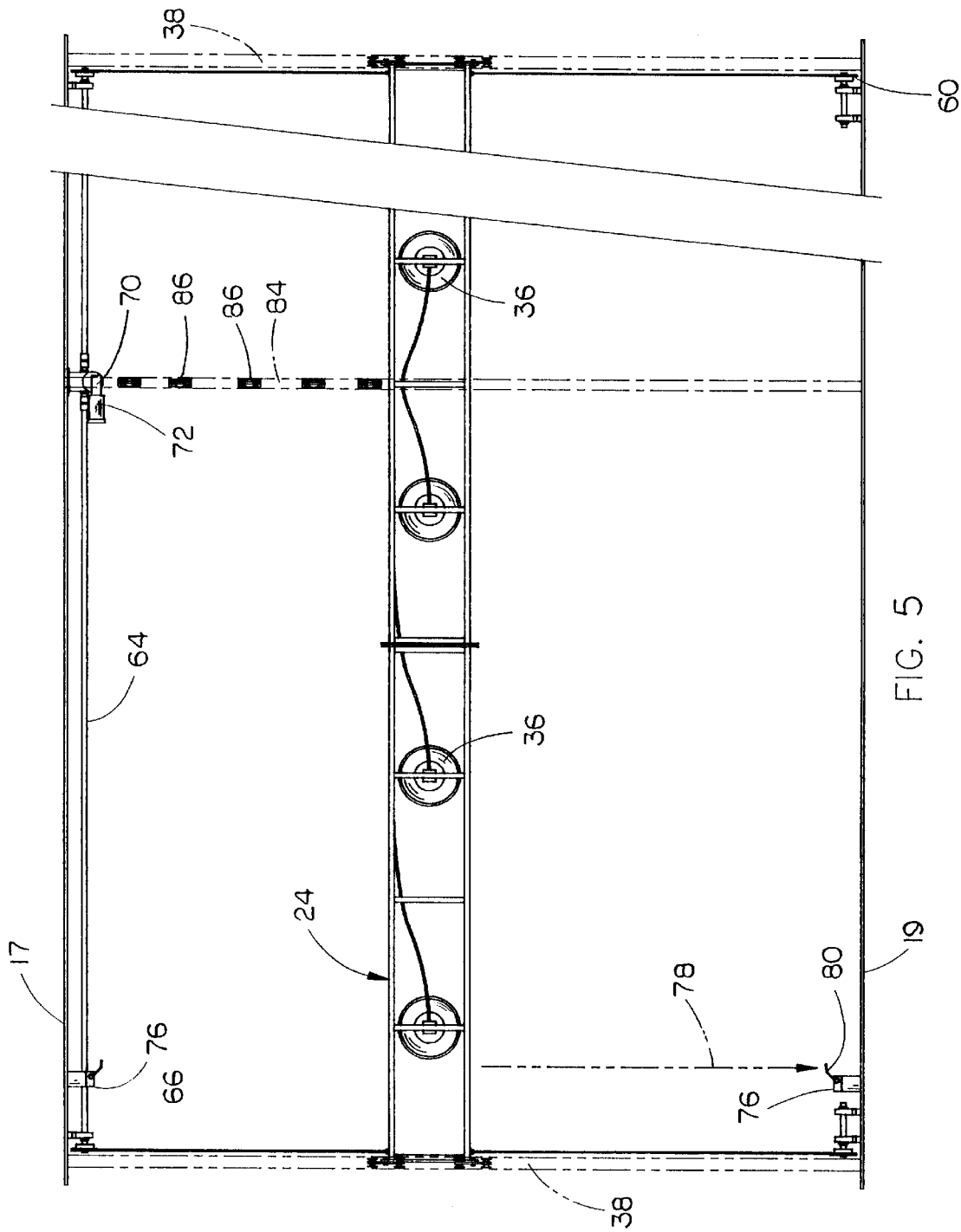
FIG. 5 is a foreshortened top plan view illustrating the travelling lighting system.
Figure 6:
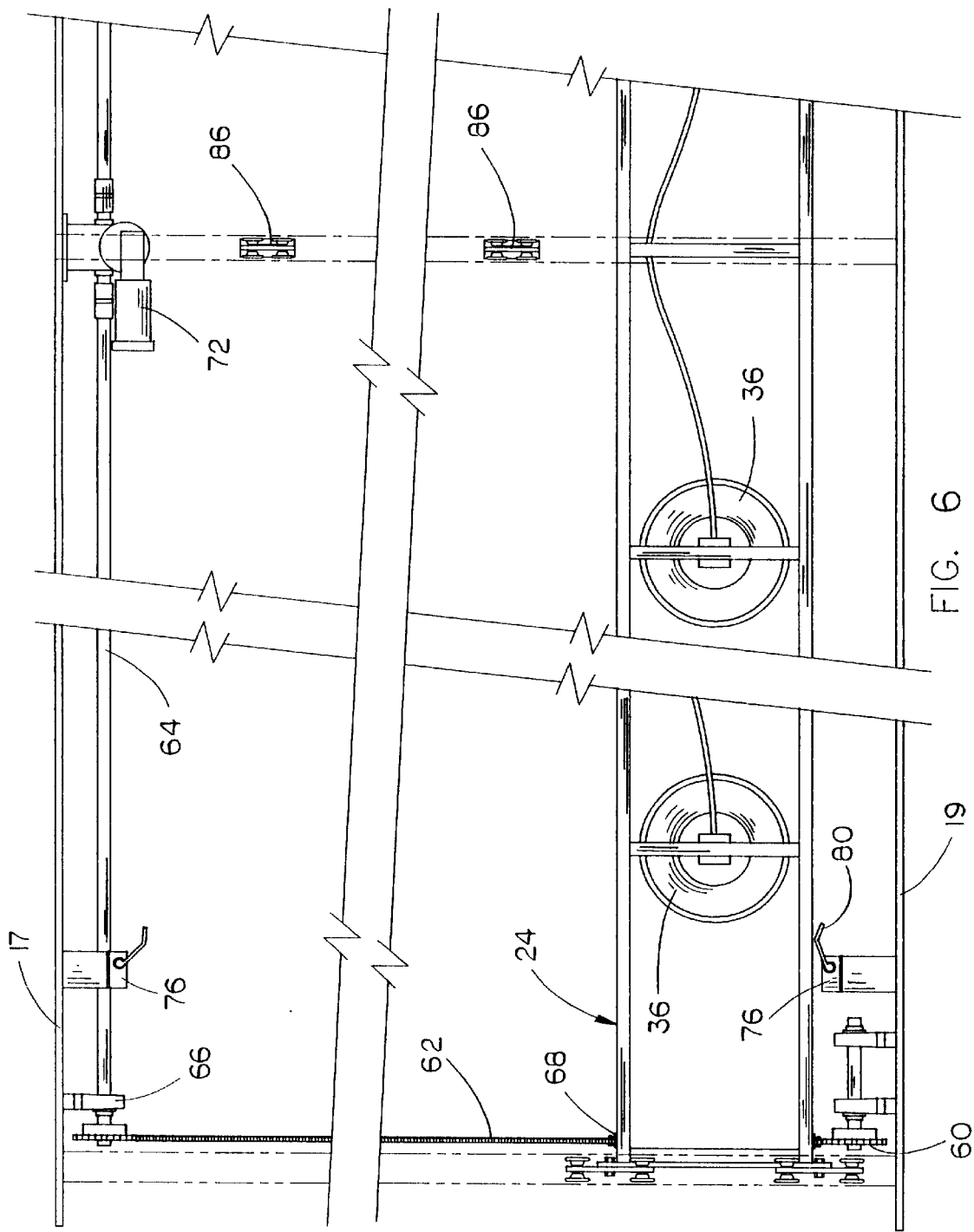
FIG. 6 is an enlarged foreshortened top plan view of the travelling lighting system illustrating the limit switch for reversing direction of the truss.

The channels 40 are supported on the greenhouse building structure, such as on end walls 17 and 19 (FIGS. 5 and 6), at spaced apart positions for alignment with the trolleys 48 on opposite ends of the truss 24. Thus, the truss 24 is suspended for rolling movement in the direction of the channels 40.

A power drive system 56 is provided to regulate movement of the truss along the channels 40. Power drive system 56 may take many forms such as the various drives provided for opening and closing large commercial garage doors. Those include chains, cables, screw drives, among others.

The illustrated embodiment in FIG. 4 shows a drive system 56 which is broadly described as including a drive wheel 58, a driven wheel 60, and an elongated tension member 62 extending around the drive and driven wheels 58 and 60 and connected to the truss 24. More particularly, drive wheel 58 is a chain sprocket secured on the end of a drive shaft 64 which is rotatably supported within bearings 66. The driven wheel 60 is likewise an idler sprocket and tension member 62 comprises a chain, the free ends of which are secured to the front and back of truss 24 by suitable brackets 68. FIG. 3 shows that the drive shafts 64 from both drive sprockets 58 connect at their inner ends to a gear box 70 having a drive connection to reversible electric motor 72. Motor 72 is actuated by electrical circuitry within control box 74.

Upon actuation of motor 72 to rotate drive shaft 64, drive sprocket 58 rotates to advance truss 24 toward or away from the drive sprocket depending upon the direction of rotation. Limit switches 76 (FIGS. 5 and 6) are situated on the greenhouse structure at the limit positions of movement for the truss 24. Upon movement of the truss 24 in the direction of arrow 78 in FIG. 5 to the position illustrated in FIG. 6, the actuator 80 of limit switch 76 is rotated to cause circuitry within the control box 74 to reverse drive motor 72, thereby continuing the advancement of truss 24, but in the opposite direction. The same operation occurs at the opposite extent of travel of the truss, with the result that it continues in a back and forth movement across the greenhouse until the system is shut down.

Circuitry within control box 74 regulates the speed of travel for truss 24. Speeds below fifty-six feet per hour are virtually unnoticeable and are preferred. Faster speeds are possible, but likely without any benefit.

Referring to FIG. 1, it is seen that the electrical power cord 82 which supplies power to the lamps 36 on truss 24 is prevented from sagging when the truss moves toward control box 24 because of a power cord support rail 84 which is supported adjacent the truss and longitudinally extended in the direction of movement of the truss 24. The rail supports a plurality of power cord trolleys 86 which freely slide or roll along the rail and which are connected to the power cord 82 at spaced apart positions therealong.

The electrical controls for the system may simply include an on/off switch for the lamps 36. The lamps typically take five to seven minutes to heat up before they stabilize and produce the desired red and blue light. Movement of the truss preferably commences after the bulbs are stabilized. Typically, the controller would light the bulbs on one truss section and then have a slight delay before lighting the bulbs on each subsequent truss section so as not to initially overload the electrical system. This also results in less electrical costs.

The speed of advancement of the truss is regulated at the control box 24. Upon initial actuation, it generally takes about ten seconds for the truss to reach the desired speed. The system monitors the amperage of the motor so that if it exceeds a predetermined level, the motor is shut down. A computer program which controls the system operation would typically provide for three attempts at start-up and, if the system fails, it will activate a warning light and preferably deactivate an autodialer to request assistance. A modem should preferably be provided so that the system could be turned on and monitored from a remote location.

The computer program would set the hours of operation for the system, perhaps 5:30 a.m. to 9:00 p.m. when harvesting in the fall. Obviously, more than twelve hours of light can thus be provided to the plants in a given day. The system likewise assures light to the plants every day, whether the sun is shining or not. Thus, the greenhouse operator can warrant that plants get a given number of foot-candles of light per day. Natural winter light is not of the same quality as summer light because of the tilt of the earth. These variances could be either compensated for or simulated by the computer program which controls the system.

With bedding plants, the greenhouse operator often has to retard growth so that the plants will not be too lush for marketing. Generally, more light results in faster growth. An advantage of the present system is that the program can be modified to bring plants along faster if they are needed for the market.

Whereas the invention has been shown and described in connection with a preferred embodiment thereof, it is apparent that many modifications, alterations and additions may be made which are within the intended broad scope of the appended claims. For example, the foot-candles of light produced by a given system may be altered by the type and number of lamps used. Whereas two lamps per eight-foot section are generally sufficient for all United States crops, three lamps per section may be provided for tropical plants if needed.

Thus there has been shown and described a travelling lighting system which accomplishes at least all of the stated objects.

I claim:

1. A travelling lighting system for a greenhouse including a roof support structure and a floor having floor space for growing plants at multiple positions throughout said floor space, comprising:

an elongated, substantially horizontally disposed lamp support beam;

a plurality of lamps supported at spaced apart locations along said lamp support beam;

a pair of elongated, substantially horizontally disposed tracks supported above said floor in parallel spaced apart relation for movably supporting said beam;

said tracks having longitudinal axes disposed transversely with respect to the longitudinal axis of said beam;

at least one trolley movable along each track and connected to said beam whereby said beam substantially spans the distance between said tracks and is moldable along the length of said tracks;

a power drive system operatively connected to said beam and actuatable to reciprocally move said beam back and forth along the length of said tracks to light the plants therebelow.

2. The travelling lighting system of claim 1 wherein said lamps are oriented to shine light downwardly from said beam to said floor space.

3. The travelling lighting system of claim 2 wherein said lamps are geothermal lamps operative to produce both red and blue light.

4. The travelling lighting system of claim 3 wherein said lamps contain high pressure sodium and metal halide.

5. The travelling lighting system of claim 1 wherein said lamp support beam comprises a truss including a plurality of longitudinally extended subbeams interconnected by a series of connecting links.

6. The travelling lighting system of claim 5 wherein said truss includes a plurality of truss sections interconnected in end-to-end relation.

7. The travelling lighting system of claim 6 wherein each truss section supports a plurality of lamps.

8. The travelling lighting system of claim 5 wherein each track comprises an inverted generally U-shaped channel having spaced apart bottom flanges.

9. The travelling lighting system of claim 8 wherein each trolley includes a frame and pairs of wheels on opposite sides of said frame and spaced for rolling support on the bottom flanges of the channel.

10. The travelling lighting system of claim 8 wherein at least one trolley is connected to each end of said truss and said tracks are spaced apart by a distance to accommodate rolling support of said trolleys at the opposite ends of said truss.

11. The travelling lighting system of claim 10 wherein said frame extends downwardly from said wheels for suspending said truss from said tracks.

12. The travelling lighting system of claim 11 wherein a pair of trolleys are connected to each end of said truss.

13. The travelling lighting system of claim 5 wherein said power drive system is adjustable to vary the speed of movement of said truss.

14. The travelling lighting system of claim 13 wherein said power drive system includes limit switches positioned in the path of said truss and engagable by said truss to reverse the direction of movement of the truss.

15. The travelling lighting system of claim 14 wherein said power drive system comprises a drive wheel and a driven wheel supported within said greenhouse at spaced apart positions, an elongated tension member extending around the drive and driven wheels and connected to said truss, and a reversible motor operably connected to said drive wheel whereby said truss is moved in forward and reverse directions in response to rotation of said drive wheel in opposite directions.

16. The travelling lighting system of claim 15 wherein said drive wheel, driven wheel and elongated tension member are arranged adjacent one end of said truss and further comprising a second drive wheel, second driven wheel and second tension member arranged adjacent the opposite end of said truss, and a drive shaft connected to and extended between said drive wheel and second drive wheel for rotation in unison.

17. The travelling lighting system of claim 5 further comprising a power cord extending from said truss to a source of electric power, a power cord support rail supported adjacent said truss and longitudinally extended in the direction of movement of said truss and a plurality of power cord trolleys connected to said power cord at spaced apart locations and movably supported on said rail to limit sagging of said power cord throughout the reciprocal movement of said truss.

18. A travelling lighting system for a greenhouse, comprising:

an elongated lamp support beam;

a plurality of lamps supported at spaced apart locations along said lamp support beam;

a pair of elongated tracks arranged in parallel spaced apart relation for movably supporting said beam;

at least one trolley movable along each track and connected to said beam whereby said beam substantially spans the distance between said track and is movable along the length of said tracks; and a power drive system operatively connected to said beam and actuatable to reciprocally move said beam back and forth along the length of said tracks.

* * * * *